US006345055B1

(12) United States Patent
Frick et al.

(10) Patent No.: US 6,345,055 B1
(45) Date of Patent: Feb. 5, 2002

(54) METHOD AND SYSTEM FOR PROVIDING INTEROPERABILITY BETWEEN NETWORK CLIENTS HAVING DIFFERENT VERSIONS OF LOCAL-AREA NETWORK EMULATION USER NETWORK INTERFACE WITHIN AN ASYNCHRONOUS TRANSFER MODE EMULATED LOCAL-AREA NETWORK

(75) Inventors: John Kevin Frick, Raleigh; Edward Joel Rovner, Chapel Hill; Cedell Adam Alexander, Jr., Durham, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/153,189

(22) Filed: Sep. 15, 1998

(51) Int. Cl.[7] .................................................. H04J 15/00
(52) U.S. Cl. ........................ 370/467; 370/401; 709/249
(58) Field of Search .................................. 370/465, 466, 370/467, 401; 709/249

(56) References Cited

U.S. PATENT DOCUMENTS

| | | |
|---|---|---|
| 5,446,736 A | 8/1995 | Gleeson et al. |
| 5,453,980 A | 9/1995 | Van Engelshoven |
| 5,627,829 A | 5/1997 | Gleeson et al. |
| 5,715,250 A | 2/1998 | Watanabe |
| 5,732,071 A | 3/1998 | Saito et al. |
| 5,737,333 A * | 4/1998 | Civanlar et al. ............ 370/352 |
| 5,740,171 A | 4/1998 | Mazzola et al. |
| 5,777,994 A * | 7/1998 | Takihiro et al. ............ 370/395 |
| 5,805,805 A * | 9/1998 | Civanlar et al. ......... 395/200.5 |
| 5,982,773 A * | 11/1999 | Nishimura et al. ......... 370/395 |
| 6,081,836 A * | 6/2000 | Karapetkov et al. ........ 709/218 |

FOREIGN PATENT DOCUMENTS

JP 3276943 A 12/1991

OTHER PUBLICATIONS

IBM Technical Disclosure Bulletin, "Addressing Source Routing in an ATM Emulated LAN", vol. 37, No. 10, Oct. 1994, pp. 75–80.
IBM Technical Disclosure Bulletin, "Multiplexing Local Area Network Emulation Data Direct Virtual Circuit Connections Between IBM Forwarding Engines," vol. 39, No. 7, Jul. 1996, pp. 37–39.

* cited by examiner

Primary Examiner—Hassan Kizou
Assistant Examiner—T Tran
(74) Attorney, Agent, or Firm—Bracewell & Patterson L.L.P.

(57) ABSTRACT

A method for providing interoperability between multiple versions of LUNI within a mixed Asynchronous Transfer Mode emulated LAN is disclosed. The mixed ATM emulated LAN includes multiple LAN emulated clients (LE clients) having different versions of LAN Emulation User Network Interface (LUNI), such as a first version LUNI and a second version LUNI. The mixed ATM emulated LAN is served by a LAN Emulation Server (LES), a Broadcast and Unknown Server (BUS), and a LAN Emulation Configuration Server (LECS). When an LE Control Frame is being sent by an LE client having a second version LUNI, a determination is made as to whether or not the LE Control Frame will be received by an LE client having a first version LUNI. In response to a determination that the LE Control Frame sent by the LE client having a second version LUNI will be received by an LE client having a first version LUNI, the LE Control Frame is copied, and the copied LE Control Frame is converted to an LE Control Frame with a format that is readable by the LE client having a first version LUNI.

15 Claims, 5 Drawing Sheets

FIG. 4

LUNI-1        LE_ARP Frame Format

| Offset | Size | Name | Function |
|---|---|---|---|
| 0 | 2 | MARKER | Control Frame = X"FF00" |
| 2 | 1 | PROTOCOL | ATM LAN Emulation protocol = X"01" |
| 3 | 1 | VERSION | ATM LAN Emulation protocol version = X"01" |
| 4 | 2 | OP-CODE | Type of request:<br>X"0006" LE_ARP_REQUEST<br>X"0106" LE_ARP_RESPONSE |
| 6 | 2 | STATUS | Always X"0000" in requests. |
| 8 | 4 | TRANSACTION-ID | Arbitrary value supplied by the requester. |
| 12 | 2 | REQUESTER-LECID | LECID of LE Client issuing the LE_ARP request. |
| 14 | 2 | FLAGS | Each bit of the FLAGS field has a separate meaning if set:<br>X"0001" Remote Address. The TARGET-LAN-DESTINATION is not registered with the LE Server. |
| 16 | 8 | SOURCE-LAN-DESTINATION | Source MAC address from data frame that triggered this LE_ARP sequence. May be encoded with "not present" LAN Destination tag. |
| 24 | 8 | TARGET-LAN-DESTINATION | Destination unicast MAC address or next Route Descriptor for which an ATM address is being sought. |
| 32 | 20 | SOURCE-ATM-ADDRESS | ATM address of originator of LE_ARP request. |
| 52 | 4 | RESERVED | Always X"00" when sent, ignored on receipt. |
| 56 | 20 | TARGET-ATM-ADDRESS | X"00" in LE_ARP request. ATM address of LE Client responsible for target LAN destination in LE_ARP response. |
| 76 | 32 | RESERVED | Always X"00" when sent, ignored on receipt. |

FIG. 5

LUNI-2 LE_ARP Frame Format

| Offset | Size | Name | Function |
|---|---|---|---|
| 0 | 2 | MARKER | Control Frame = X"FF00" |
| 2 | 1 | PROTOCOL | ATM LAN Emulation protocol = X"01" |
| 3 | 1 | VERSION | ATM LAN Emulation protocol version = X"01" |
| 4 | 2 | OP-CODE | Type of request:<br>X"0006" LE_ARP_REQUEST<br>X"0106" LE_ARP_RESPONSE |
| 6 | 2 | STATUS | Always X"0000" in requests. |
| 8 | 4 | TRANSACTION-ID | Arbitrary value supplied by the requester. |
| 12 | 2 | REQUESTER-LECID | LECID of LE Client issuing the LE_ARP request. |
| 14 | 2 | FLAGS | Each bit of the FLAGS field has a separate meaning if set:<br>X"0001" Remote Address. For LE_ARP_REQUEST, the SOURCE-LAN-DESTINATION is not registered with the LE Server. For LE_ARP_RESPONSE, the TARGET-LAN-DESTINATION is not registered with the LE Server. |
| 16 | 8 | SOURCE-LAN-DESTINATION | Source MAC address from data frame that triggered this LE_ARP sequence. May be encoded with "not present" LAN Destination tag. |
| 24 | 8 | TARGET-LAN-DESTINATION | Destination unicast MAC address or next Route Descriptor for which an ATM address is being sought. "Not Present" for a targetless LE_ARP_REQUEST. |
| 32 | 20 | SOURCE-ATM-ADDRESS | Non-multiplexed ATM address unique to requestor LE Client or X"00" if not present. |
| 52 | 2 | RESERVED | Always X"00" when sent, ignored on receipt. |
| 54 | 1 | NUMBER-TLVS | Number of Type/Length/Valve elements encoded in request/response. |
| 55 | 1 | RESERVED | Always X"00" when sent, ignored on receipt. |
| 56 | 20 | TARGET-ATM-ADDRESS | X"00" in LE_ARP request. Non-multiplexed ATM address of LE Client responsible for target LAN Destination in LE_ARP response. |
| 76 | 32 | RESERVED | Always X"00" when sent, ignored on receipt. |
| 108 | var | TLVs | |

METHOD AND SYSTEM FOR PROVIDING INTEROPERABILITY BETWEEN NETWORK CLIENTS HAVING DIFFERENT VERSIONS OF LOCAL-AREA NETWORK EMULATION USER NETWORK INTERFACE WITHIN AN ASYNCHRONOUS TRANSFER MODE EMULATED LOCAL-AREA NETWORK

BACKGROUND OF THE INVENTION

1. Technical Field

The present invention relates to a method and system for network processing in general, and in particular to a method and system for providing interoperability between network clients within a local-area network. Still more particularly, the present invention relates to a method and system for providing interoperability between multiple versions of LUNI within an Asynchronous Transfer Mode emulated LAN.

2. Description of the Prior Art

For several years, the embedded base of many communication networks have been established according to the IEEE 802 LAN standards, such as the IEEE 802.3 standard for Ethernet LANs and the IEEE 802.5 standard for Token-Ring LANs. These communication networks are considered to be "connectionless" because data packets can be exchanged within these networks without establishing a layer-2 connection under the seven-layer networking reference model established by the International Organization for Standardization (ISO). In addition, the applications within these communications networks typically reside on top of a layer-2 protocol and a layer-3 protocol, such as Medium Access Control (MAC) and Internet Protocol (IP), respectively.

With the advent of Asynchronous Transfer Mode (ATM) technology, which offers the advantages of fixed-size cell switching, sealablility from a few megabits to hundreds of megabits, the ability to offer guaranteed quality of service on a per connection basis, etc., it is desirable to interconnect a LAN which is still under one of the IEEE 802 LAN standards (or so-called a Legacy LAN) with communication networks that are equipped with ATM capabilities. In order to take advantage of the vast base of existing LAN application software, the ATM Forum has defined an ATM service, commonly known as a LAN Emulation service, that emulates services of existing LANs across an ATM network and can be supported via a software layer in end systems such as workstations, servers, bridges, etc. The LAN Emulation service enables an end system to connect to an ATM network and allows any software application within the end system to interact with other systems within the ATM network as if the end system is attached to a traditional LAN.

In January 1995, the ATM Forum promulgated the LAN Emulation over ATM Version 1—LUNI Specification (LUNI-1 specification) to define a LAN Emulation User Network Interface (LUNI) for LAN Emulation (LE) clients within an ATM emulated LAN, the pertinent portion of which is incorporated by reference herein. Subsequently, in July 1997, the ATM Forum approved the LAN Emulation over ATM Version 2—LUNI Srecification (LUNI-2 specification), the pertinent portion of which is incorporated by reference herein. The LUNI-2 specification intends to provide additional extensions for improving the capabilities of LE clients while maintaining compatibility with existing LUNI-1 LE client implementations. One of the defined LUNI-2 extensions is to allow LE clients to append a variable length field, known as a Type/Length/Values (TLVs) field, to the end of some LE Control Frames. On the other hand, with the exception of LE Configuration Server (LECS) Configurations Request and Response Control Frames, the LUNI-1 specification does not define any TLVs field for LE Control Frames. In fact, all LUNI-1 LE Control Frames are specified with a fixed-length of 108 bytes.

Because of the above-mentioned differences between the LUNI-1 specification and the LUNI-2 specification, interoperability problems may arise between LUNI-1 LE clients and LUNI-2 LE clients in a mixed emulated LAN environment. For example, a LUNI-1 LE client may neglect to transmit each reserved field with a zero value because some of these reserved fields are typically not utilized by LUNI-1 LE clients, and LUNI-2 LE clients will interpret the data transmitted in these reserved fields and attempt to perform operations as dictated by the LUNI-2 specification. As another example, a LUNI-1 LANE client may neglect to properly process an LE Control Frame originated by a LUNI-2 LE client that is not 108 bytes in length, such as discarding the entire LE Control Frame due to its non-conformance with the LUNI-1 specification. These kinds of interoperability problems could cause various problems to the network depending on the robustness and the level of adherence of LUNI-1 LE clients to the LUNI-1 specification during the LE client implementation. Consequently, it would be desirable to provide a method and system for improving the interoperability between network clients having different versions of local-area network (LAN) emulation user network interface (LUNI) from each other within an Asynchronous Transfer Mode emulated LAN.

SUMMARY OF THE INVENTION

In accordance with a method and system of the present invention, a mixed ATM emulated LAN includes multiple LAN emulated clients (LE clients) having different versions of LAN Emulation User Network Interface (LUNI), such as a first version LUNI and a second version LUNI. The mixed ATM emulated LAN is served by a LAN Emulation Server (LES), a Broadcast and Unknown Server (BUS), and a LAN Emulation Configuration Server (LECS). When an LE Control Frame is being sent by an LE client having a second version LUNI, a determination is made as to whether or not the LE Control Frame will be received by an LE client having a first version LUNI. In response to a determination that the LE Control Frame sent by the LE client having a second version LUNI will be received by an LE client having a first version LUNI, the LE Control Frame is copied, and the copied LE Control Frame is converted to an LE Control Frame with a format that is readable by the LE client having a first version LUNI.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 is an example of an LE Control Frame in accordance with the LUNI-1 specification; and FIG. 5 is an example of an LE Control Frame in accordance with the LUNI-2 specification.

DETAILED DESCRIPTION OF A PREFERRED EMBODIMENT

The present invention is applicable to a variety of data networks such as a local-area network (LAN) or a wide-area network (WAN). The computers within the data networks may be personal computers, workstations, midrange computers, or mainframe computers.

Figure 1:
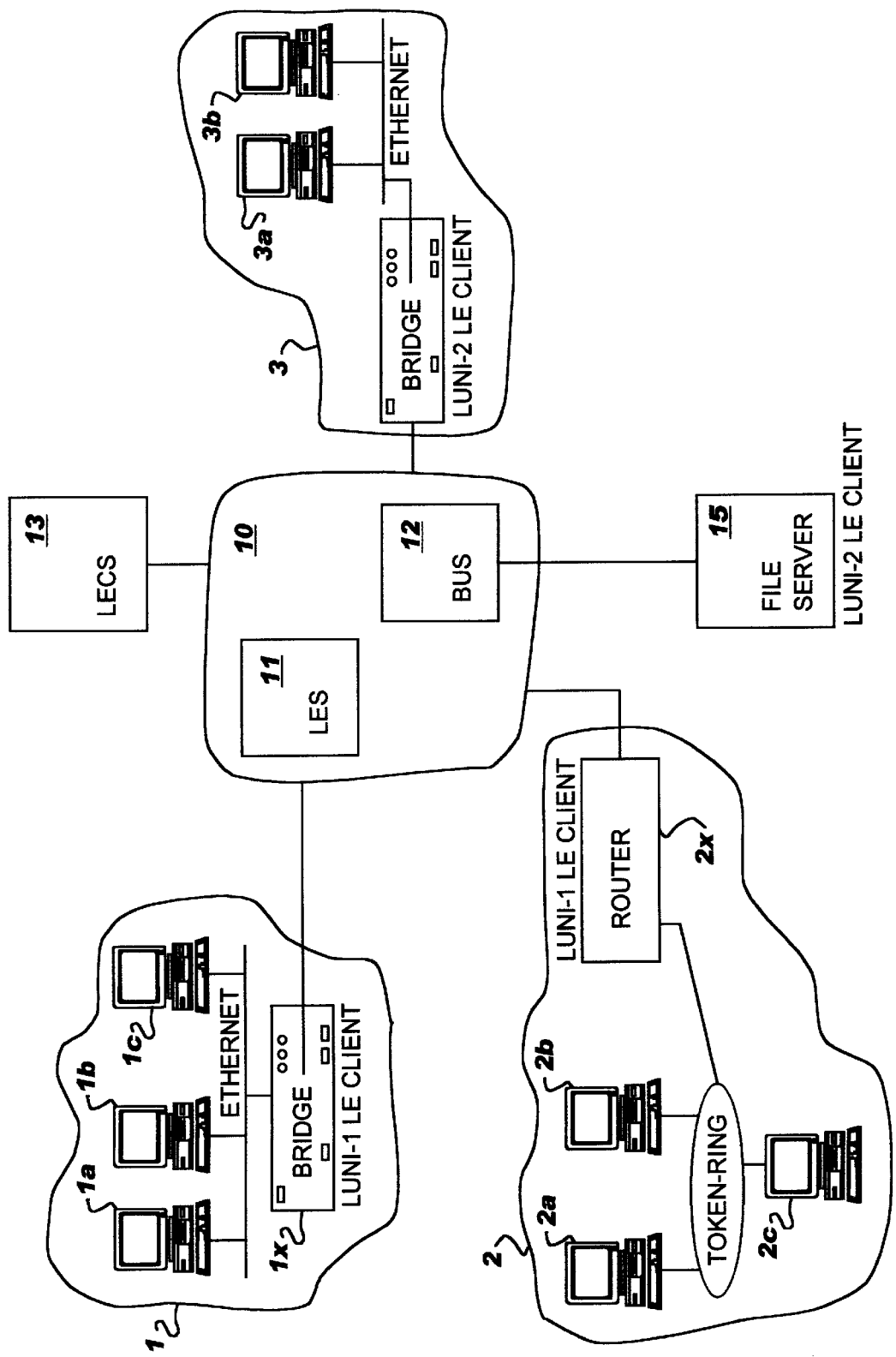
FIG. 1 is a graphical depiction of a mixed emulated LAN architecture in which a preferred embodiment of the present invention may be incorporated.

Referring now to the drawings and in particular to FIG. 1, there is illustrated a pictorial depiction of a mixed emulated LAN (ELAN) architecture in which a preferred embodiment of the present invention may be incorporated. As shown, a mixed ELAN 10 includes site 1, site 2, and site 3. Both site 1 and site 2 are, for example, LUNI-1 sites while site 3 is, for example, a LUNI-2 site. Sites 1, 2, and 3 are interconnected to a file server 15. In addition, computers 1a, 1b, and 1c of site 1 may be interconnected to each other via an Ethernet; computers 2a, 2b, and 2c of site 2 may be interconnected to each other via a Token-Ring; and computers 3a and 3b of site 3 may be interconnected to each other via another Ethernet.

ELAN 10 is served by a LAN Emulated Server (LES) 11, a Broadcast and Unknown Server (BUS) 12, and a LAN Emulated Configuration Server (LECS) 13. In order for LES 11 to provide control over ELAN 10, a bi-directional connection must be established between a LAN emulated client (LE client) within ELAN 10 and LES 11. Generally speaking, an LE client is an end-station device, a bridge or a router, such as a bridge 1x, that is directly connected to ATM switch 14. Once the LE client has obtained an LES address from LECS 13, the LE client then utilizes a join procedure to become a member of ELAN 10. During the join procedure, the LE client identifies its address(es), requests membership in ELAN 10, and conveys characteristics such as LAN type, proxy status, etc. to LES 11.

The initialization of an LE client is divided into five phases, namely, a LECS Connect phase, a Configuration phase, a Join phase, an Initial Registration phase, and a BUS Connect phase. These five phases must be performed in sequence, starting with the LECS Connect phase. During the LECS Connect phase, the LE client establishes its connection with LECS 13. During the Configuration phase, the LE client obtains the ATM address of LES 11, and other additional configuration parameters if necessary. During the Join phase, the LE client establishes its connection with LES 11 and determines the operating parameters of ELAN 10. The LE client may also implicitly register on a single unicast LAN Destination with LES 11 as a result of joining ELAN 10. After completing the Join phases, the LE client may attempt to register additional LAN Destinations via a Registration procedure. During the BUS Connect phase, the LE client connects to BUS 12. All five phases of the initialization procedure are required in order for the LE client to achieve full interoperability. Following the completion of the BUS Connect phase, the initialization procedure is complete, and the LE client becomes operational.

According to both LUNI-1 and LUNI-2 Specifications, each LE client within ELAN 10 must establish a single point-to-point Virtual Channel Connection (VCC), called a Control Direct VCC, with LES 11 for the purpose of sending various LE Control Frames on ELAN 10. Each LE client must also reside as a leaf on a LES point-to-multipoint VCC, called a Control Distribute VCC, for the purpose of receiving LE Control Frames distributed by LES 11. Generally speaking, most LES implementations only set up one Control Distribute VCC per ELAN; however, a LES may setup additional Control Distribute VCCs, provided each LE client in the ELAN is a leaf on only one Control Distribute VCC at any time.

After an LE client has joined and registered with LES 11, LES 11 can start to provide information such as ATM addresses and MAC addresses to the LE client. Also, LES 13 can utilize the registered information of the LE client to resolve MAC addresses to ATM addresses or to forward any resolution requests. BUS 12 provides a connectionless data forwarding function such as data broadcasting, multicasting, and unicasting to any registered LE client within ELAN 10. Each LE client is also responsible for setting up a bi-directional connection to BUS 12, over which BUS 12 sends broadcast and multicast traffic to the LE client.

As currently stated, the LUNI-2 specification allows a LUNI-2 LE client to append a variable length field, known as a Type/Length/Values (TLVs) field, to the end of some LE Control Frames sent by the LUNI-2 LE client. The LUNI-2 specification also defines that a NUMBER-TLVS field of an LE Control Frame must be set to a zero value for LUNI-1 LE clients. An example of an LE Control Frame in accordance with the LUNI-2 specification, such as an Address Resolution Frame having a TLVs field at offset 108, is shown in FIG. 5. On the other hand, the LUNI-1 specification does not define any TLVs field for LE Control Frames, and all LUNI-1 LE Control Frames are specified with a fixed-length of 108 bytes. Furthermore, the LUNI-1 specification defines that all reserved fields of an LE Control Frames should be ignored on receipt and should have a value of zero on transmit. An example of an LE Control Frame in accordance with the LUNI-1 specification, such as an Address Resolution Frame, is shown in FIG. 4. Because of these differences between the LUNI-1 specification and the LUNI-2 specification, interoperability problems may arise between LUNI-1 LE clients and LUNI-2 LE clients within a mixed ELAN. For example, referring back to FIG. 1, a LUNI-1 LE client in site 1 of mixed ELAN 10 may neglect to transmit a zero value in all reserved fields within an LE Control Frame because some of these reserved fields are typically not utilized by the LUNI-1 LE client in site 1, a LUNI-2 LE client in site 3 of mixed ELAN 10 may interpret the data in these reserved fields and attempt to perform operations specified in the LUNI-2 specification. As a result, error occurs between the LUNI-1 LE client in site 1 and the LUNI-2 LE client in site 3 of mixed ELAN 10.

In accordance with a preferred embodiment of the present invention, a solution to the above-mentioned interoperability problem resides with the LES for a mixed ELAN. Because all LE clients must register with the LES within the mixed ELAN, the LES "knows" which LE client is a LUNI-1 LE client and which LE client is LUNI-2 LE client. By segmenting the LUNI-1 LE clients from the LUNI-2 LE clients, the LES can insure that LUNI-2 formatted LE Control Frames originated by a LUNI-2 LE client will be properly formatted in the LUNI-1 format, prior to transmission to the LUNI-1 LE client(s). This allows optimal interoperability between LUNI-1 LE clients and LUNI-2 LE clients without homogenizing a mixed ELAN by replacing or upgrading older LUNI-1 LE clients to LUNI-2 LE clients.

During implementation, the LES is utilized to set up at least two Control Distribute VCCs for the mixed ELAN, one for LUNI-1 LE clients and the other for LUNI-2 LE clients. As an LE client joins the mixed ELAN, the LES adds the joining client to the appropriate Control Distribute VCC, based on the LUNI-2 capable indicator flag. Because LUNI-1 LE clients and LUNI-2 LE clients reside on different Control Distribute VCCs, the LES can insure that all LE clients within the mixed ELAN will receive properly formatted LE Control Frames based the LUNI-2 capable indicator flag value passed in the LUNI-2 LE clients LE Join Request to the LES during the registration of the LE client.

Figure 2:
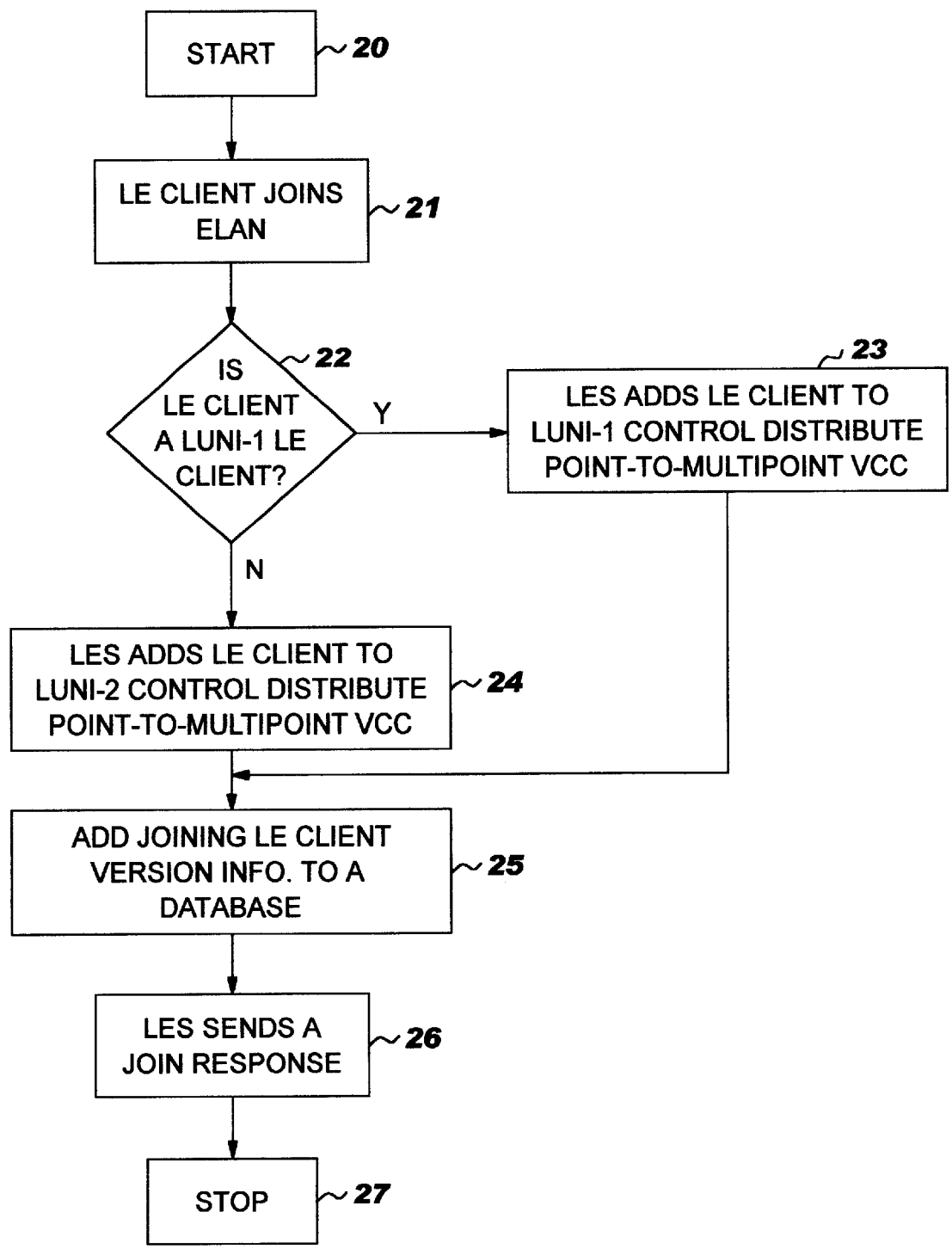
FIG. 2 is a high-level logic flow diagram for depicting the separation of LUNI-1 and LUNI-2 control domains, in accordance with a preferred embodiment of the present invention.

With reference now to FIG. 2, there is depicted a high-level logic flow diagram for illustrating the separation of LUNI-1 and LUNI-2 control domains, in accordance with a preferred embodiment of the present invention. Starting at block 20, an LE client intending to join an ELAN sends a Joint Control Frame to the LES on a Control Direct VCC, as shown in block 21. A determination is then made as to whether or not the LE client is a LUNI-1 LE client, as depicted in block 22. If the LE client is a LUNI-1 LE client, the LES adds the LE client to a LUNI-1 Control Distribute Point-to-Multipoint VCC, as illustrated in block 23. Otherwise, if the LE client is not a LUNI-1 LE client, the LES adds the LE client to a LUNI-2 Control Distribute Point-to-Multipoint VCC, as shown in block 24. The version information (i.e., whether LUNI-1 or LUNI-2 ) is added to a database within the LES, as depicted in block 25. The LES then sends a Join Response to the joining LE client, as depicted in block 26. Finally, the process exits at block 27.

Figure 3:
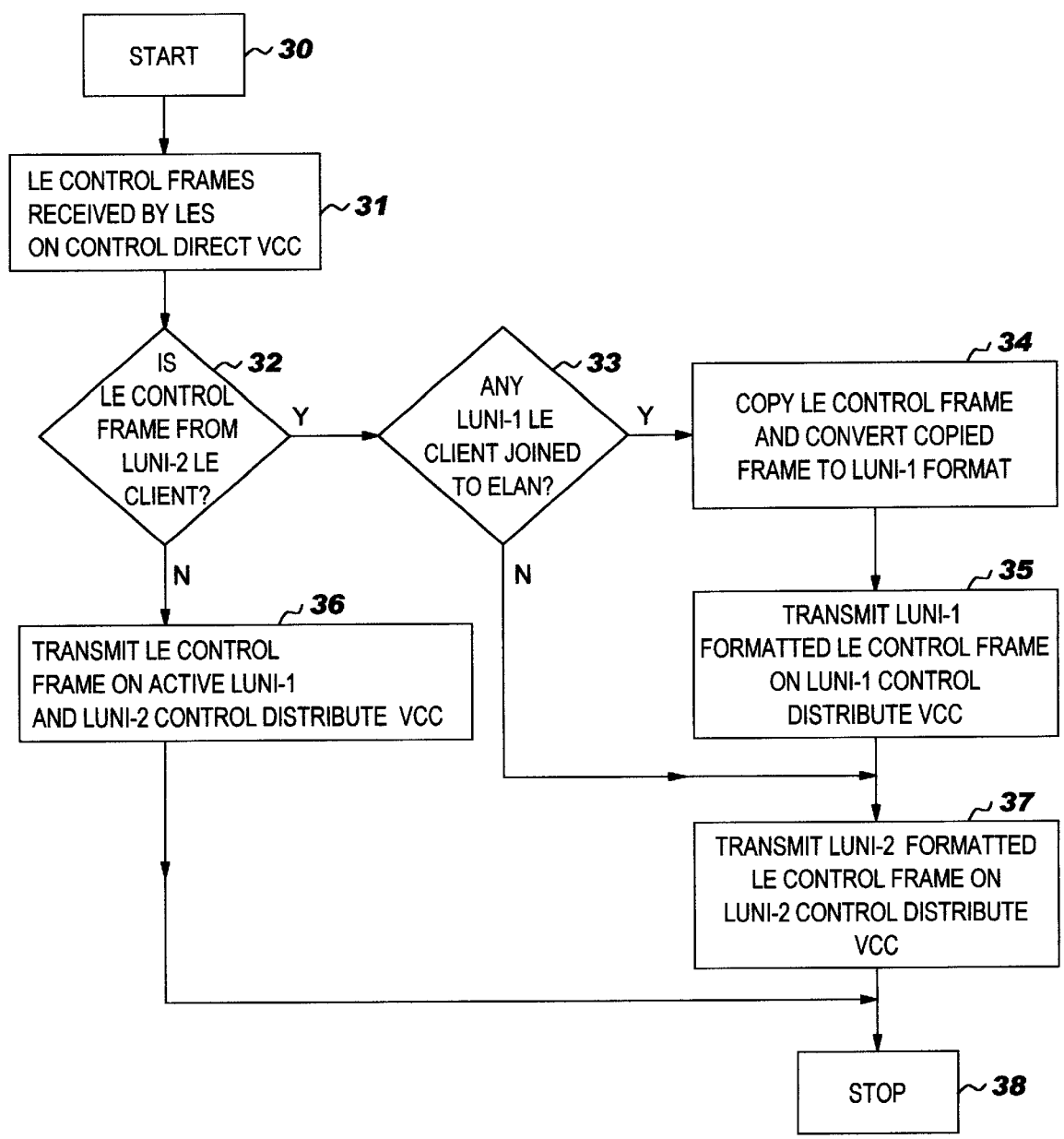
FIG. 3 is a high-level logic flow diagram for depicting the management of a received LE Control Frame within a mixed ELAN having LUNI-1 and LUNI-2 LE clients, in accordance with a preferred embodiment of the present invention.

Referring now to FIG. 3, there is depicted a high-level logic flow diagram for illustrating the management of a received LE Control Frame within a mixed ELAN having LUNI-1 and LUNI-2 LE clients, in accordance with a preferred embodiment of the present invention. Starting at block 30, an LE Control Frame is received by the LES on a Control Direct VCC, as shown in block 31. A determination is then made as to whether or not the LE Control Frame is from a LUNI-2 LE client, as depicted in block 32. If the LE Control Frame is from a LUNI-2 LE client, another determination is then made as to whether or not there is a LUNI-1 LE client joined to the ELAN, as illustrated in block 33. If there is a LUNI-1 LE client joined to the ELAN, the LE Control Frame is copied and the copied LE Control Frame is converted to a LUNI-1 formatted LE Control Frame, as shown in block 34, and the LUNI-1 formatted LE Control Frame is transmitted to the LUNI-1 Control Distribute VCC, as depicted in block 35. Otherwise, if there is no LUNI-1 LE client joined to the ELAN, the LUNI-2 formatted LE Control Frame is transmitted on the LUNI-2 Control Distribute VCC, as illustrated in block 37.

However, if the LE Control Frame is not from a LUNI-2 LE client, the LE Control Frame is transmitted on an active LUNI-1 and an active LUNI-2 Control Distribute VCC, as shown in block 36. Finally, the process exits at block 38.

Table I summarizes all the scenarios in which an LE Control Frame should be modified by a LES prior to its transmission. Within Table I, "unchanged" denotes an LE Control Frame should be transmitted as received, and "modified" denotes an LE Control Frame should be truncated to 108 bytes and all reserved fields are cleared (ire., set to zero). These reserved fields can be found, for example, at Offsets 52, 55, and 76 of the Address Resolution Frame, as shown in FIG. 4.

TABLE I

| Origin of LE | LE Control Frame Destination | |
|---|---|---|
| Control Frame | LUNI-1 LE client | LUNI-2 LE client |
| LUNI-1 LE client | unchanged | unchanged |
| LUNI-2 LE client | modified | unchanged |

As has been described, the present invention provides a method and system for providing interoperability between multiple versions of LUNI within an ATM ELAN. With the LES intercepting and modifying LE Control Frames sent from LUNI-2 LE clients and destined for LUNI-1 LE clients, interoperability between LE clients is achieved. Modification of LE Control Frames originated from a LUNI-1 LE client and destined for a LUNI-2 LE client is not needed, since all LUNI-2 LE clients must accept LUNI-1 formatted LE control frames.

It is important to note that although the present invention has been described in the context of a computer system within a network, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for providing interoperability between multiple versions of local-area network (LAN) emulated clients (LE clients) within a mixed Asynchronous Transfer Mode (ATM) emulated LAN, said method comprising the steps of:

determining whether or not an LE Control Frame sent by a second version LE client will be received by a first version LE client within a mixed ATM emulated LAN, wherein said mixed ATM emulated LAN includes said first version LE client and said second version LE client, wherein said mixed ATM emulated LAN is served by a LAN Emulation Server (LES), a Broadcast and Unknown Server (BUS), and a LAN Emulation Configuration Server (LECS); and in response to a determination that said LE Control Frame sent by said second version LE client will be received by said first version LE client, copying said LE Control Frame and converting said copied LE Control Frame to an LE Control Frame readable by said first version LE client.

2. The method according to claim 1, wherein said copying and converting step further includes a step of transmitting said LE Control Frame readable by said first version LE client on a first version Control Distribute Virtual Channel Connection.

3. The method according to claim 1, wherein said method further includes a step of transmitting said LE Control Frame to said second version LE client on a second version Control Distribute Virtual Channel Connection, in response to a determination that said LE Control Frame sent by said second version LE client will not be received by said first version LE client.

4. The method according to claim 3, wherein said method further includes a step of transmitting said LE Control Frame to said first and second version LE clients on a first and a second version Control Distribute Virtual Channel Connections, in response to a determination that said LE Control Frame is sent by said first version LE client.

5. The method according to claim 1, wherein said first version LE client is an LE client in accordance with the LAN Emulation over ATM Version 1—LUNI Specification and said second version LE client is an LE client in accordance with the LAN Emulation over ATM Version 2—LUNI Specification.

6. A mixed Asynchronous Transfer Mode (ATM) emulated LAN capable of providing interoperability between multiple versions of local-area network (LAN) emulated clients (LE clients), said mixed ATM emulated LAN comprising:

means for determining whether or not an LE Control Frame sent by a second version LE client will be received by a first version LE client within a mixed ATM emulated LAN, wherein said mixed ATM emulated LAN includes said first version LE client and said second version LE client, wherein said mixed ATM emulated LAN is served by a LAN Emulation Server (LES), a Broadcast and Unknown Server (BUS), and a LAN Emulation Configuration Server (LECS); and means for copying said LE Control Frame and means for converting said copied LE Control Frame to an LE Control Frame readable by said first version LE client, in response to a determination that said LE Control Frame sent by said second version LE client will be received by said first version LE client.

7. The mixed ATM emulated LAN according to claim 6, wherein said copying means and converting means further includes a means for transmitting said LE Control Frame readable by said first version LE client on a first version Control Distribute Virtual Channel Connection.

8. The mixed ATM emulated LAN according to claim 6, wherein said mixed ATM emulated LAN further includes a means for transmitting said LE Control Frame to said second version LE client on a second version Control Distribute Virtual Channel Connection, in response to a determination that said LE Control Frame sent by said second version LE client will not be received by said first version LE client.

9. The mixed ATM emulated LAN according to claim 6, wherein said mixed ATM emulated LAN further includes a means for transmitting said LE Control Frame to said first and second version LE clients on a first and a second version Control Distribute Virtual Channel Connections, in response to a determination that said LE Control Frame is sent by said first version LE client.

10. The mixed ATM emulated LAN according to claim 6, wherein said first version LE client is an LE client in accordance with the LAN Emulation over ATM Version 1—LUNI Specification and said second version LE client is an LE client in accordance with the LAN Emulation over ATM Version 2—LUNI Specification.

11. A computer program product for providing interoperability between multiple versions of local-area network (LAN) emulated clients (LE clients) within a mixed Asynchronous Transfer Mode (ATM) emulated LAN, said computer program product comprising:

program code means for determining whether or not an LE Control Frame sent by a second version LE client will be received by a first version LE client within a mixed ATM emulated LAN, wherein said mixed ATM emulated LAN includes said first version LE client and said second version LE client, wherein said mixed ATM emulated LAN is served by a LAN Emulation Server (LES), a Broadcast and Unknown Server (BUS), and a LAN Emulation Configuration Server (LECS); and program code means for copying said LE Control Frame and means for converting said copied LE Control Frame to an LE Control Frame readable by said first version LE client, in response to a determination that said LE Control Frame sent by said second version LE client will be received by said first version LE client.

12. The computer program product according to claim 11, wherein said program code means for copying and converting further includes a program code means for transmitting said LE Control Frame readable by said first version LE client on a first version Control Distribute Virtual Channel Connection.

13. The computer program product according to claim 11, wherein said computer program product further includes a program code means for transmitting said LE Control Frame to said second version LE client on a second version Control Distribute Virtual Channel Connection, in response to a determination that said LE Control Frame sent by said second version LE client will not be received by said first version LE client.

14. The computer program product according to claim 11, wherein said program code means for transmitting said LE Control Frame to said first and second version LE clients on a first and a second version Control Distribute Virtual Channel Connections, in response to a determination that said LE Control Frame is sent by said first version LE client.

15. The computer program product according to claim 11, wherein said first version LE client is an LE client in accordance with the LAN Emulation over ATM Version 1—LUNI Specification and said second version LE client is an LE client in accordance with the LAN Emulation over ATM Version 2—LUNI Srecification.

* * * * *